United States Patent
Quakernack et al.

(10) Patent No.: US 11,570,121 B2
(45) Date of Patent: Jan. 31, 2023

(54) APPARATUS FOR BUFFERED TRANSMISSION OF DATA

(71) Applicant: WAGO Verwaltungsgesellschaft mbH, Minden (DE)

(72) Inventors: Frank Quakernack, Bielefeld (DE); Daniel Jerolm, Bad Essen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/152,309

(22) Filed: Jan. 19, 2021

(65) Prior Publication Data

US 2021/0144100 A1 May 13, 2021

Related U.S. Application Data

(63) Continuation of application No. PCT/IB2019/055289, filed on Jun. 24, 2019.

(30) Foreign Application Priority Data

Jul. 17, 2018 (DE) .................. 10 2018 005 618.0

(51) Int. Cl.
*H04L 47/62* (2022.01)
*H04L 49/90* (2022.01)

(52) U.S. Cl.
CPC ...... *H04L 47/6245* (2013.01); *H04L 49/9094* (2013.01)

(58) Field of Classification Search
CPC .................. H04L 47/6245; H04L 49/9094
See application file for complete search history.

(56) References Cited

U.S. PATENT DOCUMENTS

| | | | | |
|---|---|---|---|---|
| 7,568,066 B2* | 7/2009 | Yule | .......................... | G06F 5/14 711/147 |
| 2009/0074308 A1* | 3/2009 | Sasaki | .................. | H04N 19/426 382/232 |
| 2015/0212945 A1* | 7/2015 | Jain | ...................... | G06F 12/0864 711/128 |
| 2017/0142022 A1* | 5/2017 | Bartels | ................ | H04L 47/6245 |
| 2018/0089114 A1* | 3/2018 | Hanscom | ............ | G06F 13/1673 |
| 2018/0176144 A1* | 6/2018 | Luo | .......................... | H04L 47/56 |
| 2018/0349035 A1* | 12/2018 | Ellis | ........................ | G06F 3/061 |

OTHER PUBLICATIONS

International Search Report dated Oct. 28, 2019 in corresponding application PCT/IB2019/055289.

* cited by examiner

*Primary Examiner* — Jason E Mattis
*Assistant Examiner* — Bao G Nguyen
(74) *Attorney, Agent, or Firm* — Muncy, Geissler, Olds & Lowe, P.C.

(57) ABSTRACT

An apparatus with a data input, a data output, a first buffer, a second buffer, and control logic is disclosed. The control logic is equipped to route data packets that are received through the data input to the first buffer or the second buffer and to flag them as valid or invalid, and to provide data packets that are to be output through the data output from the first buffer or the second buffer, equipped to provide a data packet that is to be output through the data output from the first buffer when the data packet is being written into the first buffer at the time of a start of the readout, to provide it from the second buffer when the data packet is being written into the second buffer at the time of a start of the readout.

14 Claims, 13 Drawing Sheets

APPARATUS FOR BUFFERED TRANSMISSION OF DATA

This nonprovisional application is a continuation of International Application No. PCT/IB2019/055289, which was filed on Jun. 24, 2019 and which claims priority to German Patent Application No. DE 10 2018 005 618.0, which was filed in Germany on Jul. 17, 2018 and which are both herein incorporated by reference.

BACKGROUND OF THE INVENTION

Field of the Invention

The present invention relates to an apparatus for the buffered transmission of data. In particular, the present invention relates to an apparatus with two data buffers (hereinafter referred to as buffers) and with control logic that controls write and read accesses to the buffers

Description of the Background Art

Apparatuses for buffered transmission of data that have three buffers are known from the prior art. Said apparatuses keep one buffer available for writing data and one buffer for reading out data, while the third buffer serves for transmission of data between the ports.

SUMMARY OF THE INVENTION

The invention improves on the prior art inasmuch as the apparatuses and method according to the invention allow a transmission between a transmitter and a receiver in which only two buffers are required, wherein the transmitter can nevertheless write data into the apparatus at any time.

An apparatus according to an exemplary embodiment of the invention includes a data input, a data output, a first buffer, a second buffer, and control logic, wherein the control logic is equipped to route data packets that are received through the data input to the first buffer or the second buffer and to flag them as valid or invalid, and to provide data packets that are to be output through the data output from the first buffer or the second buffer, wherein the control logic is furthermore equipped to provide a data packet that is to be output through the data output from the first buffer when the data packet is being written into the first buffer at the time of a start of the readout, to provide the data packet from the second buffer when the data packet is being written into the second buffer at the time of the start of the readout, and to provide the data packet from the buffer that has the newest valid data packet when no data packet is being written into the buffers at the start of the readout.

Here, the term "data input" as used in the description and the claims can be understood to mean, in particular, a communication connection through which data can be transmitted to the apparatus. The communication connection can be, e.g., an electrically conductive connection by means of which current and/or voltage levels representing data can be supplied to the apparatus. Furthermore, the term "data output" as used in the description and the claims can be understood to mean, in particular, a communication connection through which the data can be output by the apparatus. The communication connection can be, e.g., an electrically conductive connection by means of which current and/or voltage levels representing data can be output by the apparatus.

In addition, the term "buffer" as used in the description and the claims can be understood to mean, in particular, a memory element (component) or an addressable region in a memory element (component). This means that a distinction between buffers can relate both to a logical distinction, e.g. with regard to addressable regions in a memory element (component, e.g., "DP-RAM Page 1, DP-RAM Page 2"), and to a distinction with regard to the memory elements (components) involved. Furthermore, the term "control logic" as used in the description and the claims can be understood to mean, in particular, a circuit that is equipped to control the apparatus, and in particular to choose the buffer from which a data packet is to be provided and the buffer into which a data packet is to be written, starting from an analysis of the state of the apparatus or of the read and/or write requests ("read/write requests") made to the apparatus.

In addition, the term "data packet" as used in the description and the claims can be understood to mean, in particular, binary coded information items that are transmitted/received in a block, wherein the information items typically share a context. Moreover, a data packet often has a defined structure that makes it possible to assign a binary coded information item to a corresponding section of the data packet. Moreover, the phrase "start of the readout" as used in the description and the claims can be understood to mean, in particular, a point in time immediately before the output of a first bit of a data packet to be provided.

The phrase "immediately before" can be understood here to mean that the point in time is nonetheless sufficiently in advance of the output that the apparatus is able to make decisions with respect to the buffer from which the data packet is to be provided. Consequently, the point in time can be calculated, for example, by subtracting the time required by the control logic for deciding which buffer is to provide the data packet from the point in time when a first bit is actually output.

In addition, the terms "valid" and "invalid" as used in the description and the claims relate, in particular, to the correctness of data packets (or to the correctness of the data packet content). An incorrect data packet is, for example, a data packet in which a write error has occurred during writing into the buffer (and that consequently deviates in an erroneous way from an appropriate data packet in form and/or in content), or a data packet that was written correctly into the buffer but contains incorrect information (on account of a previous error).

An apparatus according to the invention thus allows a continuous flow of data from the transmitter (data source) to the receiver (data consumer) in that data packets are written into the two buffers and are provided from the two buffers in alternation.

The apparatus can be used, e.g., as a 2-buffer FIFO in automation engineering, where it can be implemented in a transceiver. The transceiver can be used, for example, for forwarding process data from a field bus to a local bus (e.g., in a bus coupler or a bus controller). The process data can be written into the 2-buffer FIFO in the form of data packets/data blocks (fixed length). In this case, the control logic can monitor that the data exactly correspond to a previously configured data block length.

Once the data have been written into the FIFO, the data can be flagged as "valid" or as "invalid" by the transmitter. Moreover, the transmitter can declare the data invalid even during the writing process. With a "valid" signal, in contrast, the transmitter can communicate that the provided data are valid. In the event of an error, the receiver can, moreover, be supplied with data from the other buffer in order to obtain the last valid data. It is possible, furthermore, to provide a data packet while the data packet is being written into the buffer.

Preferably, the control logic is equipped to flag a data packet as invalid if, while the data packet is being provided from one of the buffers, writing of a data packet into one of the buffers is begun.

As a result, it is possible to ensure, for example, that the newest data packet at the time is always provided, wherein the data packet can be available or an availability can be imminent.

Preferably, the control logic is equipped to flag a data packet as invalid if, while a data packet is being provided from a buffer, a part of the data packet that is still to be read out is overwritten.

Consequently, errors can be detected that arise when the write operation takes place faster than the read operation.

Preferably, the control logic is equipped to generate a read error signal when a data packet is read out that is flagged as invalid during or after the writing of the data packet.

Consequently, the transmission of data packets that are invalid or no longer current can be avoided. The read error signal thus indicates whether a data packet currently being read out is valid or not.

Preferably, the control logic is equipped to provide the data packet that is to be output through the data output from the buffer that was last written if no data packet is being written into the address areas at the start of the readout and the data packet written into the last-written buffer is flagged as valid.

Consequently, it is ensured that the most current (valid) data packet is always transmitted to the receiver.

The control logic can be equipped to continue providing the same newest valid data packet until a newer valid data packet is available.

The last valid data can thus be output (or read out) multiple times until newer valid data are written into the FIFO. As a result, it is possible to ensure that the receiver can be continuously supplied with data that are valid (in the error-free case).

The control logic can be equipped to generate an overflow signal when a valid data packet is overwritten without having been read out.

The control logic can be equipped to generate an underflow signal when a valid data packet is read out more than once.

The apparatus can be integrated into a system (e.g., an automation system) that has a transmitter (e.g., a sensor) and a receiver (e.g., a central control unit) in order to provide a continuous flow of data packets transmitted in a buffered manner from the transmitter.

The transmitter can be equipped to read back a data packet from the buffer that has the newest valid data packet and to write it into the apparatus again when the transmitter has no valid data packet that is more current, but is equipped to write a data packet into the apparatus at specific points in time.

A method according to the invention for transmission of data packets from a transmitter to a receiver by means of an apparatus having a first buffer and a second buffer and control logic comprises a writing of data packets into the first buffer or the second buffer and a flagging of the data packets as valid or invalid, and a readout of a data packet from the first buffer when the data packet is being written into the first buffer at the time of a start of the readout, and a readout of the data packet from the second buffer when the data packet is being written into the second buffer at the time of a start of the readout, and a readout of the data packet from the buffer that has the newest valid data packet when no data packet is being written into the buffers at the start of the readout.

The method additionally can include a generation of a read error signal if, while a data packet is being read out from one of the buffers, writing of a data packet into one of the buffers is begun.

The method additionally can include a generation of a read error signal if a data packet is read out that is flagged as invalid during or after the writing of the data packet.

The method additionally can include a generation of an overflow signal if a valid data packet is overwritten without having been read out.

The method additionally can include a generation of an underflow signal if a valid data packet is read out more than once.

The method additionally can include a generation of an empty signal if no buffer has a valid data packet.

The method additionally can include a readback by the transmitter of a data packet and a repeated writing of the read-back data packet into a buffer when the transmitter has no valid data packet that is more current, but is equipped to write a data packet into the apparatus at specific points in time.

Further scope of applicability of the present invention will become apparent from the detailed description given hereinafter. However, it can be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
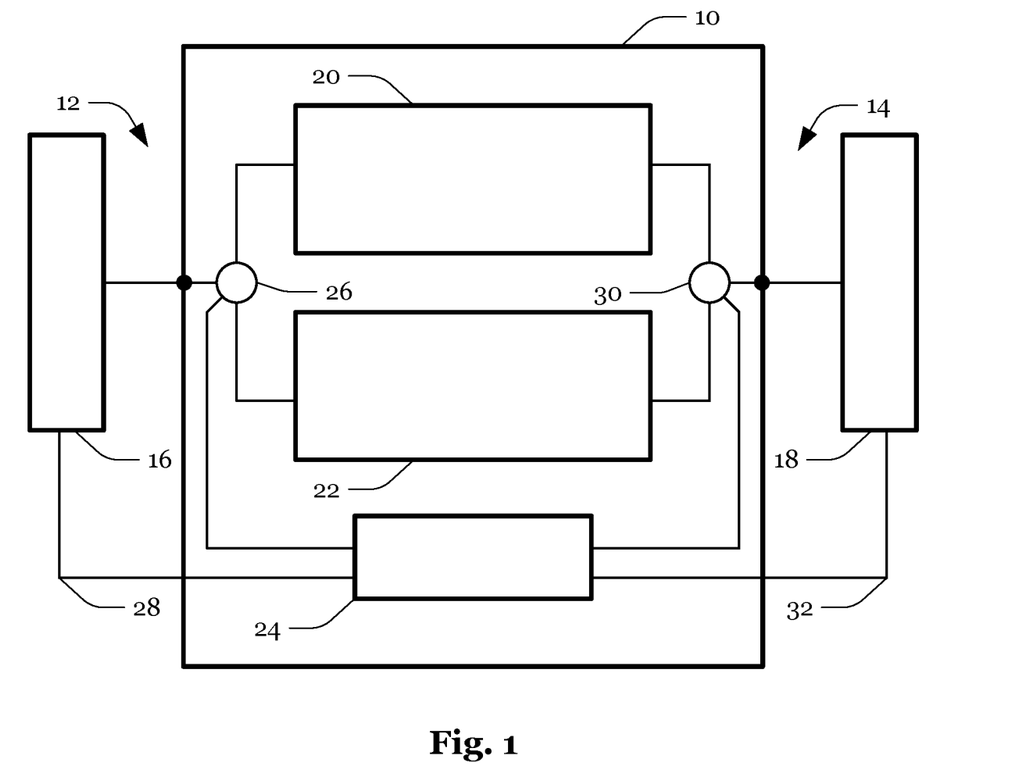
FIG. 1 shows an apparatus according to the invention in accordance with an exemplary embodiment.

An. FIG. 1 shows an apparatus 10 according to the invention in accordance with an exemplary embodiment. The apparatus 10 includes a data input 12 and a data output 14. The apparatus 10 is connected to a transmitter 16 (data producer) through the data input 12. At regular intervals, the transmitter 16 generates data packets that are to be transmitted to a receiver 18 (data consumer). The receiver 18 is connected to the data output 14 of the apparatus 10, and requests data packets at regular intervals or reads data packets out from the apparatus 10 at regular intervals.

The apparatus 10 additionally includes a first buffer 20, a second buffer 22, and control logic 24. The control logic 24 is equipped to route data packets that are received through the data input 12 to the first buffer 20 or the second buffer 22. For this purpose, the control logic 24 can establish a data connection between the data input 12 and the first buffer 20 or a data connection between the data input 12 and the second buffer 22 by means of a first changeover switch 26. Consequently, data packets received through the data input 12 are written into the first buffer 20 or into the second buffer 22 as a function of the setting of the first changeover switch 26.

The control logic 24 is furthermore equipped to flag data packets written into the first buffer 20 or second buffer 22 as valid or as invalid. The flagging of a data packet as valid or invalid can be based on a signal of the transmitter 16, for example when the transmitter 16 signals that a data packet is erroneous. For this purpose, the transmitter 16 can be connected to the control logic 24 through a first control line 28, and the control logic 24 can, during the writing of a data packet or after the completion of the writing of the data packet, indicate whether the data packet or the written part of the data packet is valid or invalid. The transmitter 16, moreover, can notify the control logic 24 through the first control line 28 of a write access to the apparatus 10 or indicate a completion of a write access.

The control logic 24 is additionally equipped to provide data packets that are to be output through the data output from the first buffer 20 or the second buffer 22. For this purpose, the control logic 24 can establish a data connection between the first buffer 20 and the data output 14 or a data connection between the second buffer 22 and the data output 14 by means of a second changeover switch 30. Consequently, data packets output through the data output 14 are read out from the first buffer 20 or from the second buffer 22 as a function of the setting of the second changeover switch 30. Moreover, the same data packet can be provided repeatedly in succession as long as no newer (valid) data packet is being written into the apparatus 10.

The receiver 18 can be connected to the control logic 24 through a second control line 32. As a result, the control logic 24 can indicate to the receiver 18 during readout of a data packet or after the completion of readout of the data packet whether the data packet or the part of the data packet that has been read out is valid or invalid. Moreover, the receiver 18 can notify the control logic 24 through the second control line 32 of a read access to the apparatus 10 or indicate a completion of a read access. The control logic 24 can furthermore track which buffer 20, 22 has been written with a valid data packet and how old the data packets stored in the buffers 20, 22 are.

Figure 2:
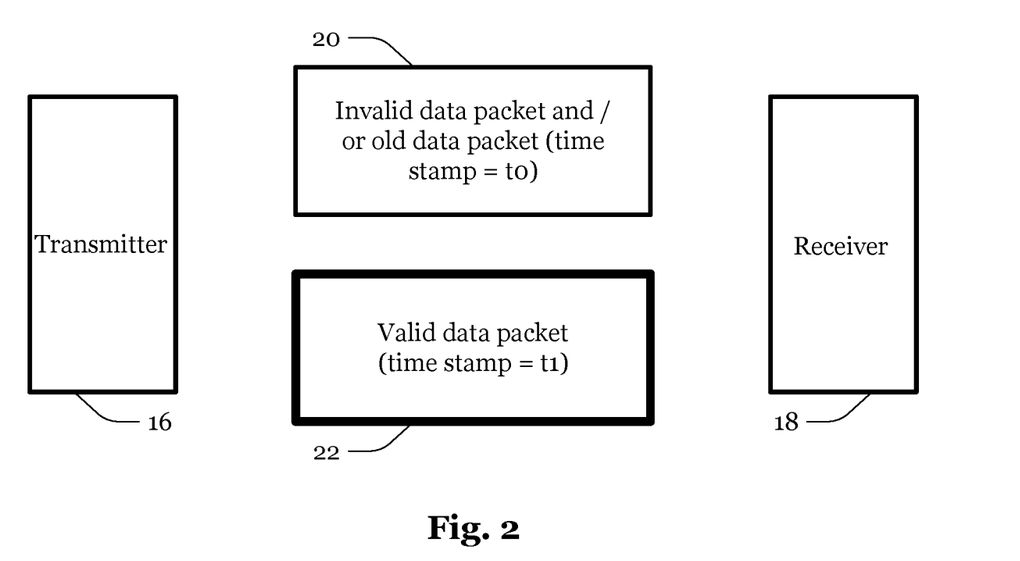
FIG. 2 illustrates a state of the apparatus shown in FIG. 1 in which neither a write nor a read access occurs.

FIG. 2 illustrates a state of the apparatus 10 shown in FIG. 1 in which neither write nor read accesses are taking place. Here, the first buffer 20 contains a first data packet and the second buffer 22 contains a second data packet. The control logic 24 determines which of the data packets is valid. If only one of the data packets is valid, the apparatus 10 provides this data packet to the receiver 18. If both data packets are valid, the apparatus 10 provides the newer of the two valid data packets (i.e., the data packet with the newer time stamp t1 >t0) to the receiver 18. If both data packets were to be invalid, this would be signaled to the receiver 18 or neither of the two data packets would be provided to the receiver 18.

Figure 3:
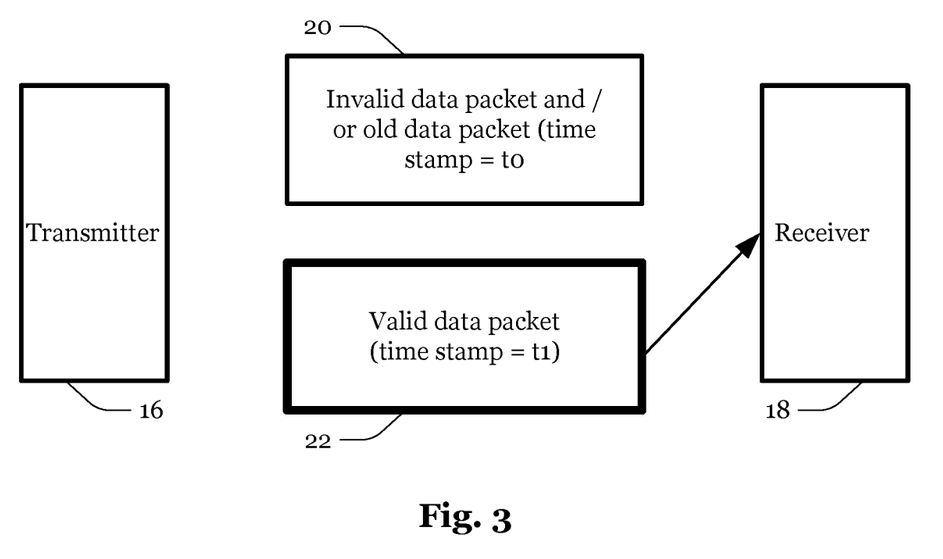
FIG. 3 illustrates a state of the apparatus shown in FIG. 1 in which a read access occurs but no write access.
Figure 4:
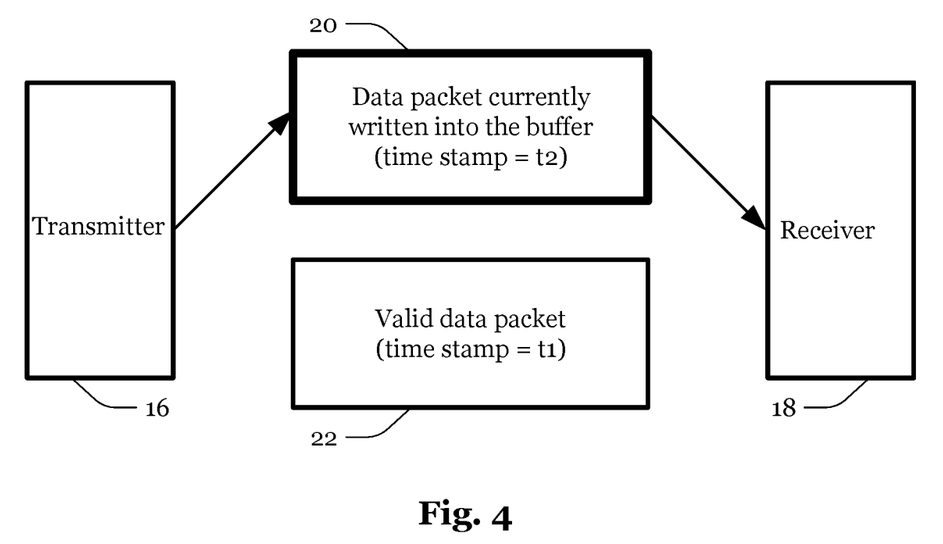
FIG. 4 illustrates a state of the apparatus shown in FIG. 1 in which a write access and a read access occur.

If, as shown in FIG. 3, a request is made by the receiver 18 and if no new data packet is being written into the apparatus 10 at the time of the readout, the apparatus 10 provides the newest valid data packet (i.e., the data packet with the newer time stamp t1 >t0) to the receiver 18. In contrast, if a data packet that has a newer time stamp t2 >t1 is being written into the apparatus 10 at the time of the request by the receiver 18, as shown in FIG. 4, then this packet is provided to the receiver 18. The provision can be aborted if the data packet written into the first buffer 20 is flagged as invalid. The data packet written into the first buffer 20 can be flagged as invalid, moreover, if the receiver 18 in reading out a data packet gets ahead of the transmitter 16 in writing the data packet and as a result the risk exists that an inconsistent data packet will be provided to the receiver 18.

The control logic 24 is thus equipped to provide a data packet, which is to be output through the data output 14, from the first buffer 20 when the data packet is being written into the first buffer 20 at the time of a start of the readout, and to provide the data packet from the second buffer 22 when the data packet is being written into the second buffer 22 at the time of the start of the readout. If no data packet is being written into the buffers 20, 22 at the start of the readout, the data packet is provided from the buffer 20, 22 that has the newest valid data packet.

If, while the newest valid data packet is being read out from the second buffer 22 (as in FIG. 3) or from the first buffer 20 (as in FIG. 4), a newer (valid) data packet is being written into the other respective buffer 20, 22, the read-out data packet can be flagged as invalid. If the read-out data packet is flagged as invalid, the readout operation can be aborted and the receiver 18 can (immediately or at a next readout time) read out the (now newest) data packet from the other respective buffer 20, 22. Alternatively, the receiver 18 can continue the readout operation and discard the read-out data packet.

Instead of flagging a (stale) data packet as invalid, the control logic 24 can also flag the data packet as stale, by which means the receiver 18 can be informed that the data packet is valid but stale. The receiver 18 can then abort the readout of the data packet now flagged as stale and (immediately or at a next readout time) read out the (newer) data packet from the other respective buffer 20, 22. Instead of aborting the readout, the receiver 18 can also read out in its entirety a data packet that is flagged (as invalid and/or stale) and discard the read-out data packet or forward it flagged as invalid. This can be advisable when, for example, an aborting of the readout would generate a read error that would have to be overcome by clearing the buffers 20, 22.

Figure 5:
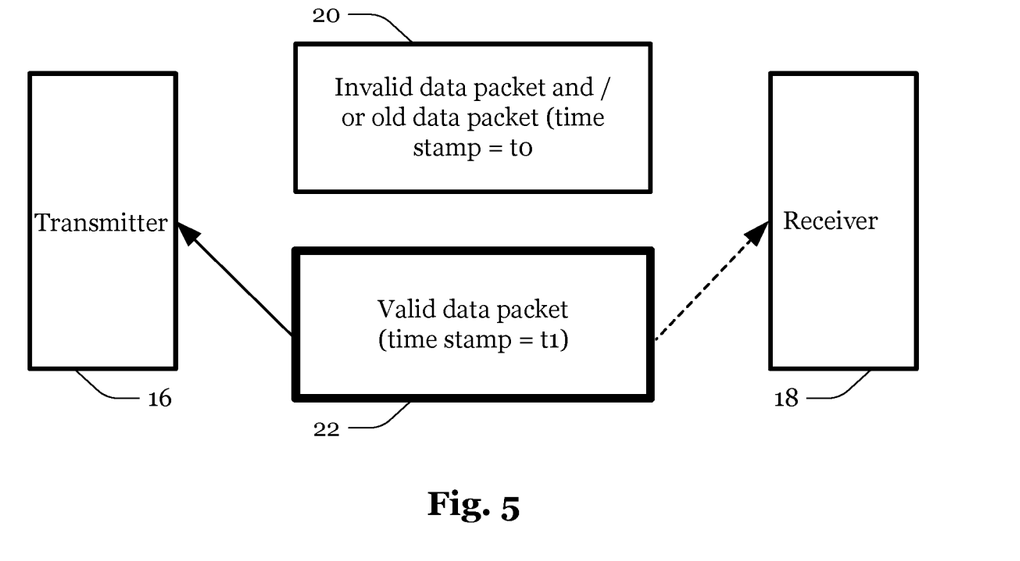
FIG. 5 illustrates a state of the apparatus shown in FIG. 1 in which a readback access occurs.
Figure 6:
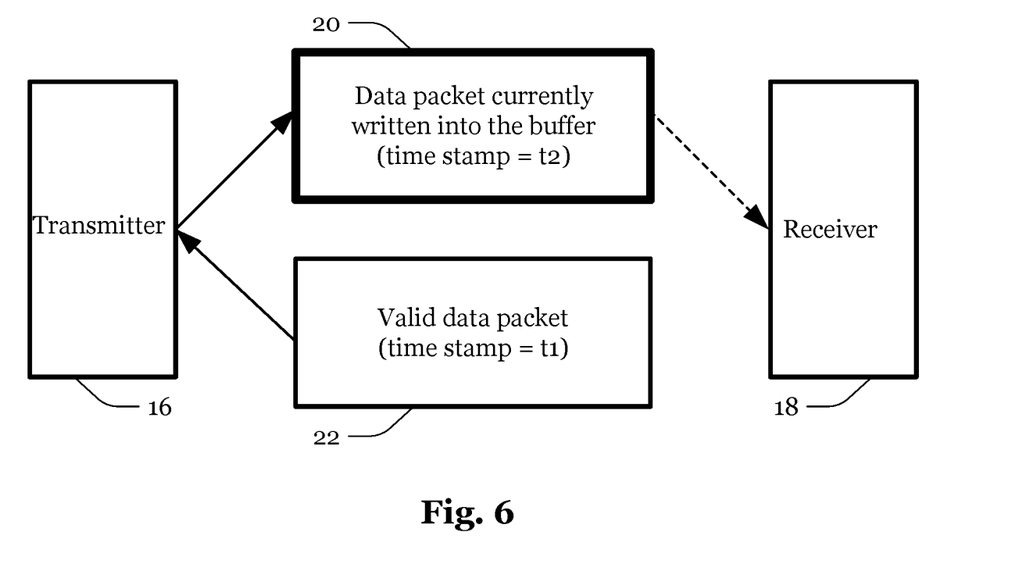
FIG. 6 illustrates a state of the apparatus shown in FIG. 1 in which a write access and a readback access occur.

As shown in FIG. 5, a data packet can be read back from a buffer 20, 22 by the transmitter 16. For example, the transmitter 16 can extract an information item from the read-back data packet and transmit this information item in a data packet that is to be written to the apparatus 10 (or replace an information item in the data packet with the extracted information item). In this way, an information item (e.g., a value such as a measured value) can be kept constant in a series of data packets (e.g., on request, for example "hold-last-value"). The readback in this case can take place during a readout of the buffer 20, 22 as well as when no data packet is being read out of the buffer 20, 22. Moreover, it is possible, as shown in FIG. 6, for the transmitter 16 to read back a data packet from one buffer 20, 22 while the transmitter 16 is writing a data packet into the other buffer 20, 22. During the readback, moreover, an arbitrary buffer 20, 22 (preferably the one written with the newest valid data packet) can be read out by the receiver 18.

Figure 7:
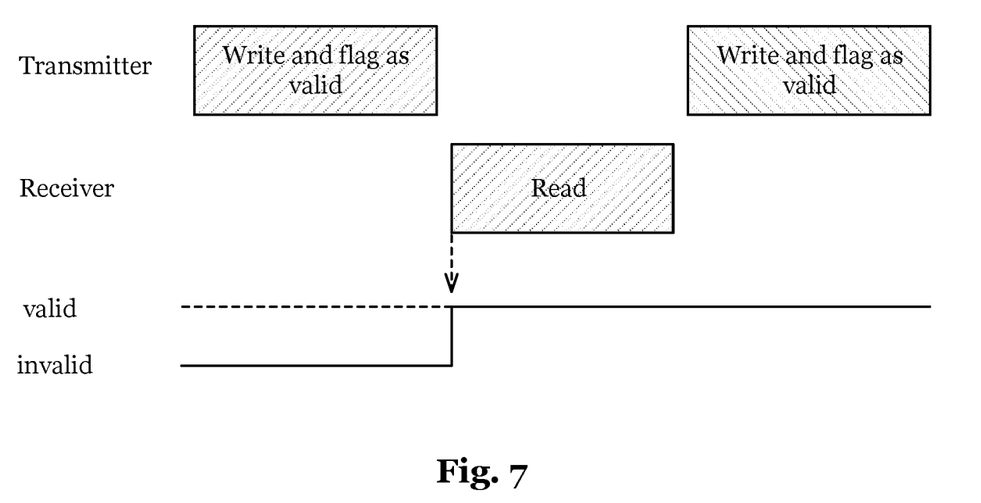
FIG. 7-FIG. 24 illustrate exemplary sequences of write and read accesses.

FIG. 7 illustrates an exemplary sequence of write and read accesses in the apparatus 10. After a data packet has been written into one of the buffers 20, 22 by the transmitter 16, the receiver 18 begins readout of the data packet. Since the data packet was flagged as valid by the transmitter 16, the apparatus 10 indicates to the receiver 18 at the time the readout is started (and beyond) that the read-out data packet is valid.

Figure 8:
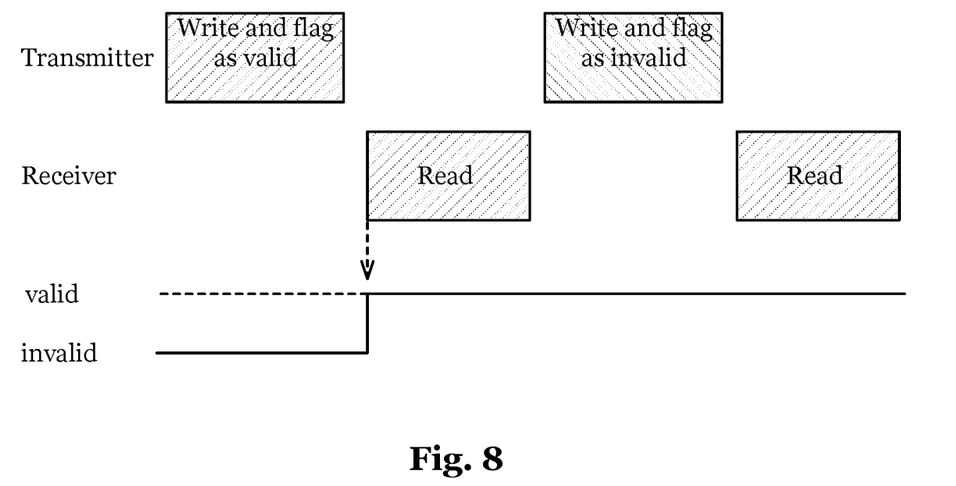

FIG. 8 illustrates an exemplary sequence of write and read accesses in which a data packet written into a buffer 20, 22 is flagged as invalid (during or after the completion of the write operation). Since a valid data packet, which was provided, is present in the apparatus 10, however, the validity signal can remain at "valid."

Figure 9:
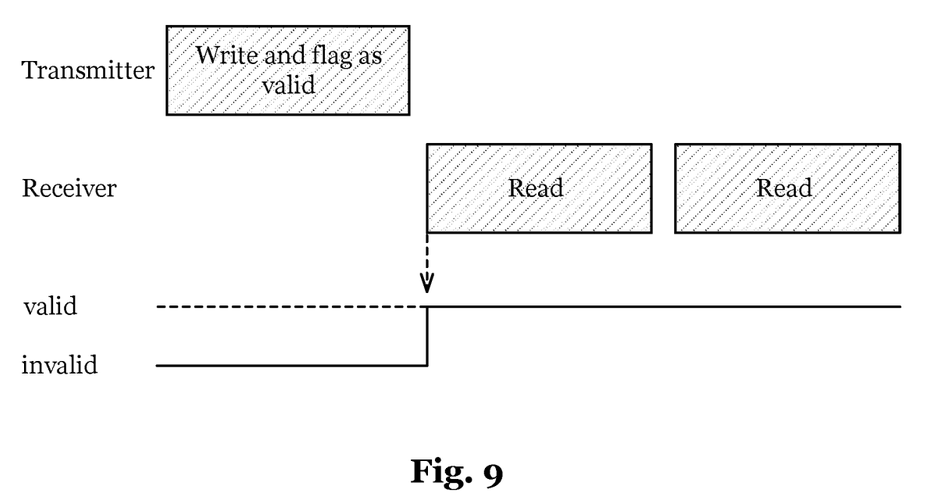

FIG. 9 illustrates an exemplary sequence of write and read accesses in which a valid data packet is repeatedly read out until the transmitter 16 provides a newer valid data packet. Because a valid data packet that can be provided is present in the apparatus 10 at all times here as well, the validity signal can remain at "valid."

Figure 10:
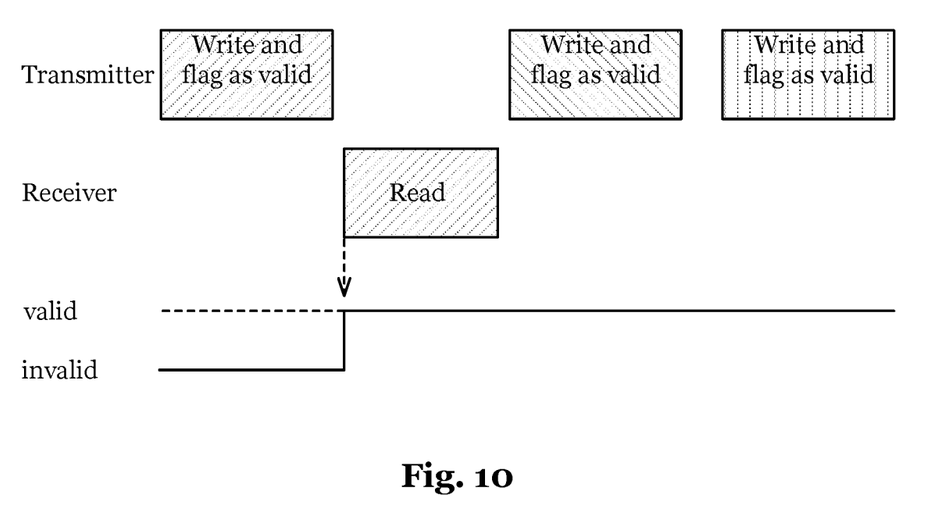

FIG. 10 illustrates an exemplary sequence of write and read accesses in which the receiver 18 misses the opportunity to pick up a data packet. Since the most current valid data packet is always provided to the receiver 18, the missed data packet is no longer delivered to the receiver and is lost.

Figure 11:
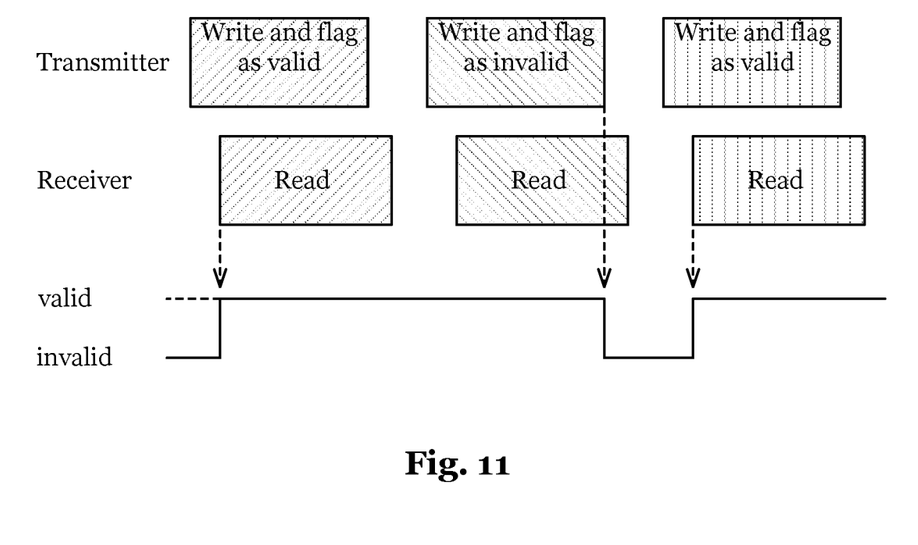

FIG. 11 illustrates an exemplary sequence of write and read accesses in which write and read accesses overlap, reducing the transmission latency. If a data packet is flagged as invalid by the transmitter 16, the receiver 18 can abort the readout of the data packet or, as shown in FIG. 11, continue the readout and discard the read-out data packet. For this purpose, the receiver 18 can continuously evaluate the validity signal and discard a data packet if the validity signal indicates an invalid data packet during the readout of the data packet.

Figure 12:
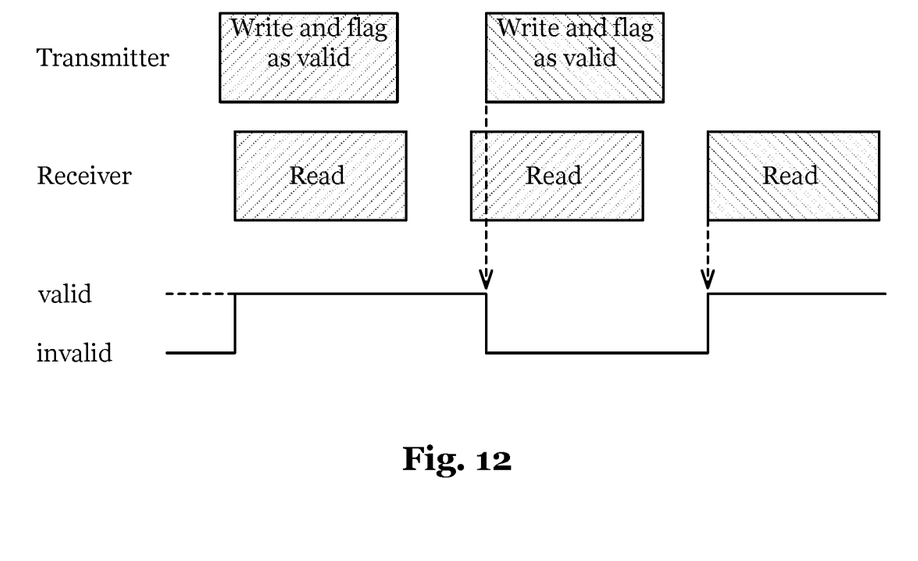

FIG. 12 illustrates an exemplary sequence of write and read accesses in which a write operation commences during a read operation. As a result of the commencing of the write operation during the read operation, the validity signal is set to "invalid" so that the receiver 18 aborts the readout operation or discards the read-out data packet.

Figure 13:
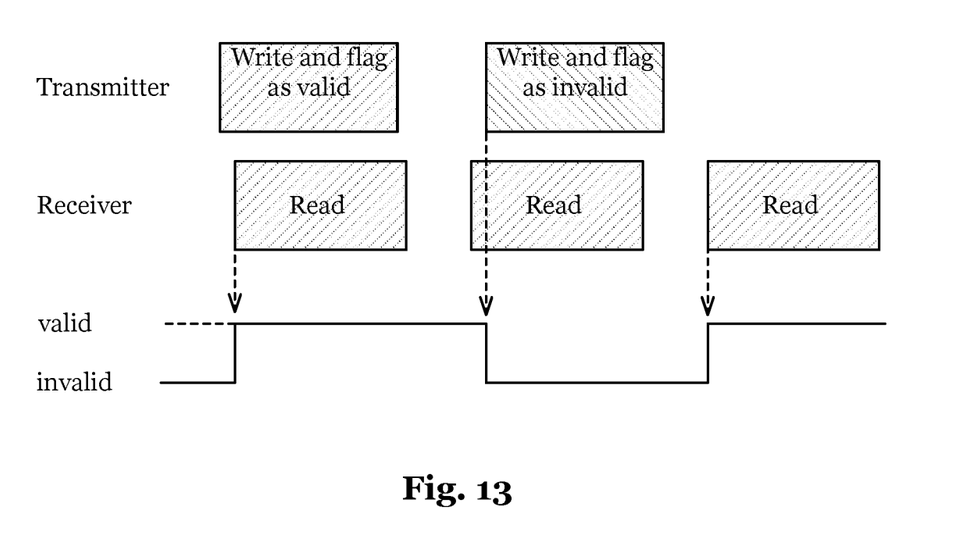

FIG. 13 illustrates an exemplary sequence of write and read accesses that differs from the sequence shown in FIG. 12 in that the data packet is flagged as invalid by the transmitter 16. As a result, the first data packet is read out again in the following read operation.

Figure 14:
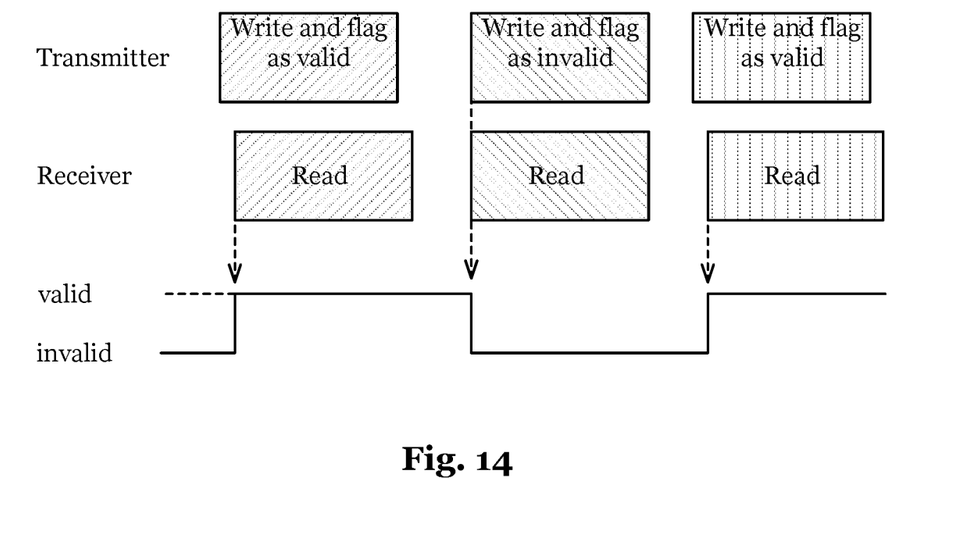

FIG. 14 illustrates an exemplary sequence of write and read accesses in which a write and a read access are started in the same clock cycle. In this case, the validity signal is set to "invalid" so that the receiver 18 aborts the readout operation or discards the read-out data packet.

Figure 15:
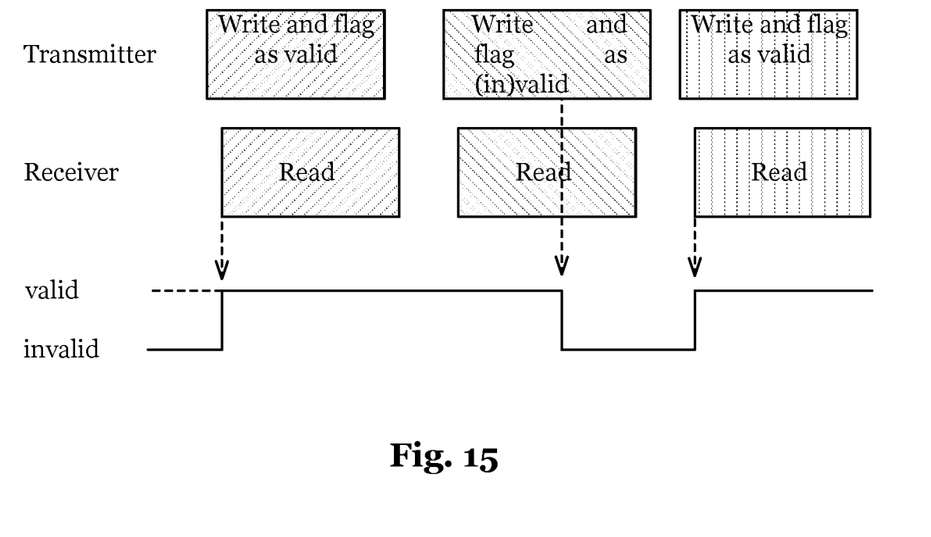

FIG. 15 illustrates an exemplary sequence of write and read accesses in which a write access proceeds more slowly than a read access taking place in parallel (directed at the same data packet) so that the receiver 18 "gets ahead of" the transmitter 16 in the buffer access. In consequence, the validity signal is set to "invalid" so that the receiver 18 aborts the readout operation or discards the read-out data packet.

Figure 16:
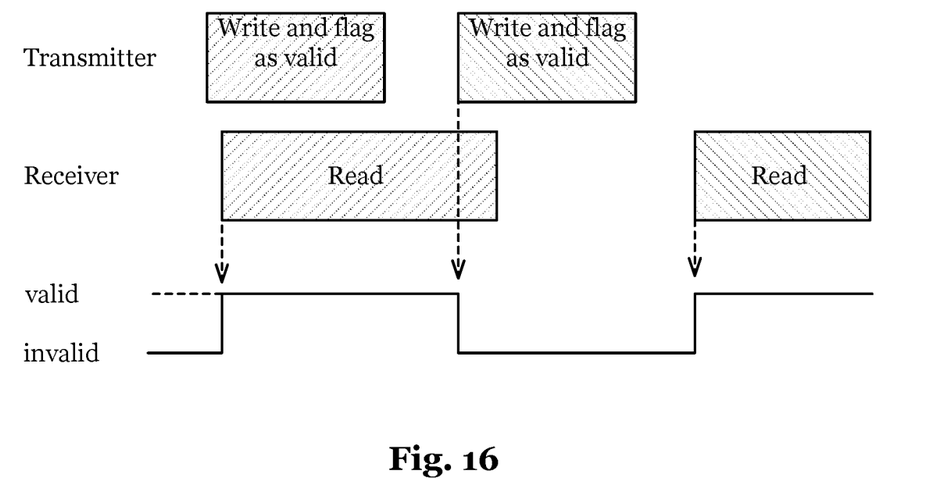

FIG. 16 illustrates an exemplary sequence of write and read accesses in which a read access proceeds more slowly than a write access taking place in parallel so that the transmitter 16 begins to write a new data packet while the receiver is still reading out an older data packet, so that the latter is now stale. In consequence, the validity signal is set to "invalid" so that the receiver 18 aborts the readout operation, discards the read-out data packet, or forwards it flagged as stale.

Figure 17:
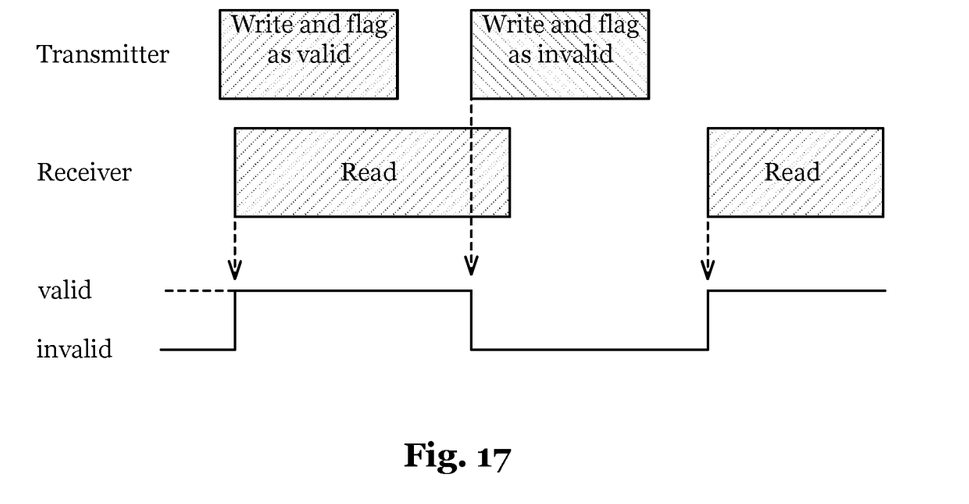

FIG. 17 illustrates an exemplary sequence of write and read accesses that differs from the sequence shown in FIG. 16 in that the data packet is flagged as invalid by the transmitter 16. As a result, the first data packet is read out again in the following read operation.

Figure 18:
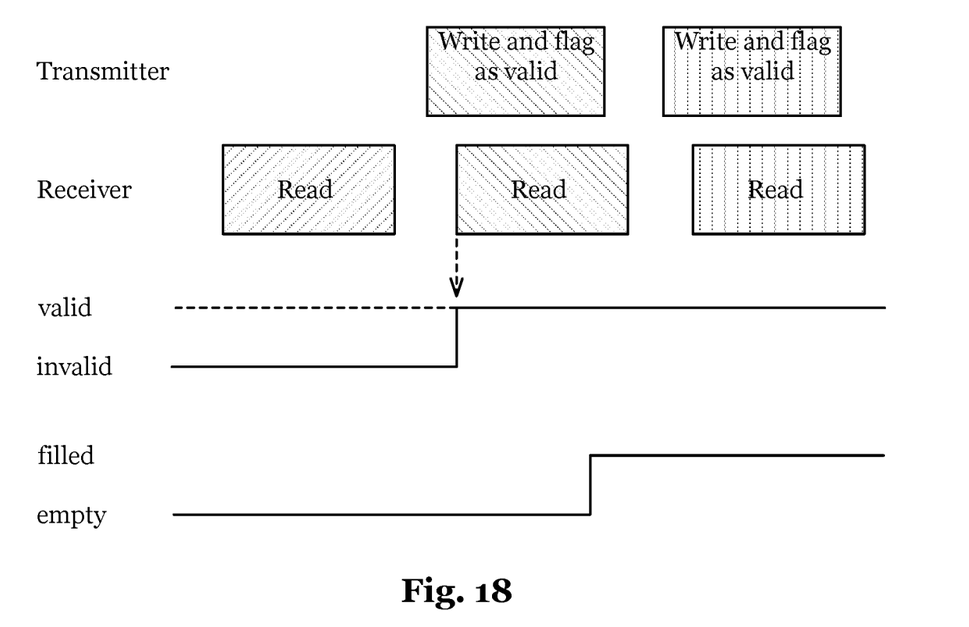

FIG. 18 illustrates an exemplary sequence of write and read accesses in which a read access to empty buffers 20, 22 takes place. Because the validity signal is set to "invalid," the receiver 18 recognizes that the read-out data packet is to be discarded. After a first data packet has been written into a buffer 20, 22 by the transmitter 16, the apparatus 10 signals that it is no longer empty and a valid data packet can be provided.

Figure 19:
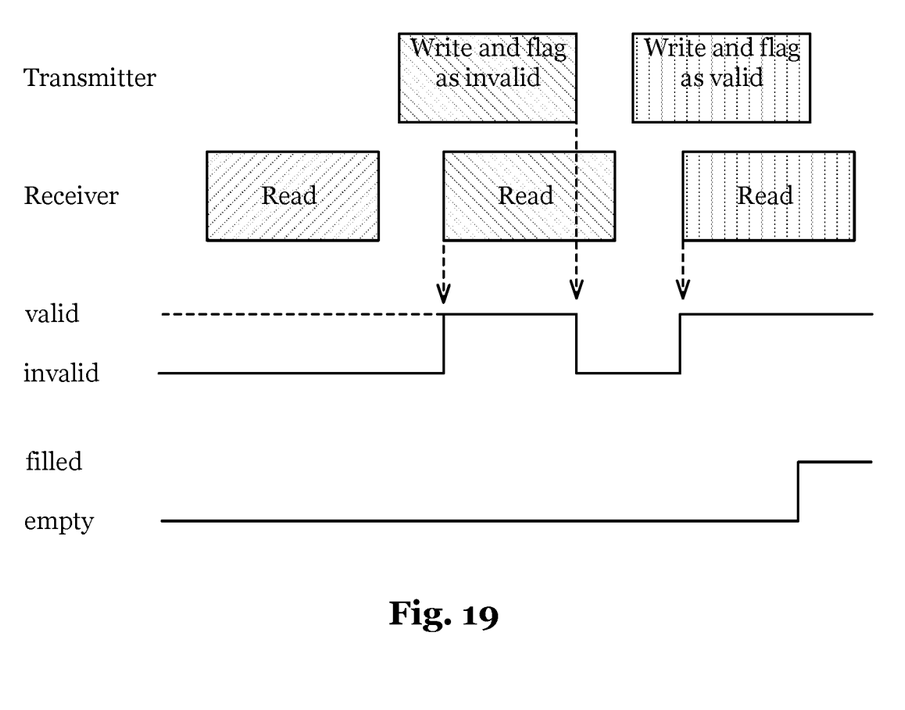

FIG. 19 illustrates an exemplary sequence of write and read accesses that differs from the sequence shown in FIG. 18 in that the first data packet is flagged as invalid by the transmitter 16. Therefore, the validity signal is set to "invalid" so that the receiver 18 aborts the readout operation or discards the read-out data packet.

Figure 20:
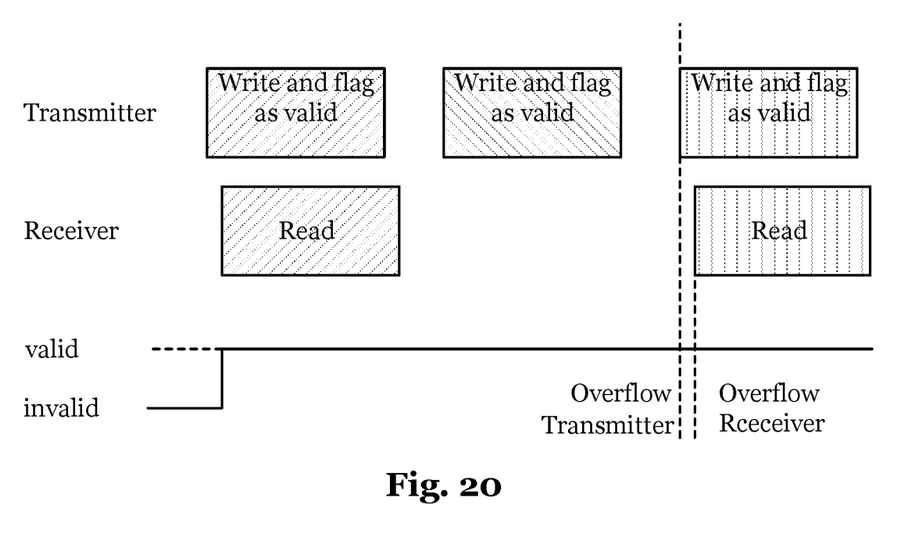

FIG. 20 illustrates an exemplary sequence of write and read accesses that triggers an overflow signal. Here, a valid data packet is being written into a buffer 20, 22 before a valid data packet written beforehand into the apparatus 10 has been read out. As indicated in FIG. 20, the overflow can be signaled to the transmitter 16 and the receiver 18 at different times, for example to the transmitter 16 at the start of writing the valid data packet and to the receiver 18 during reading of the valid data packet.

Figure 21:
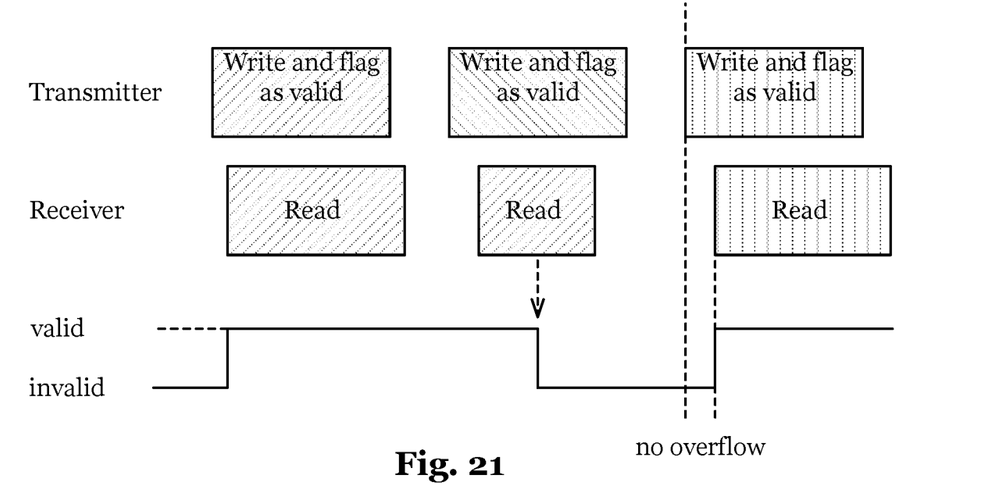

FIG. 21 illustrates an exemplary sequence of write and read accesses that differs from the sequence shown in FIG. 20 in that the receiver 18 attempts to read out the data packet, but the readout attempt fails. In this case, no overflow signal is triggered, even though the data packet cannot be read out successfully.

Figure 22:
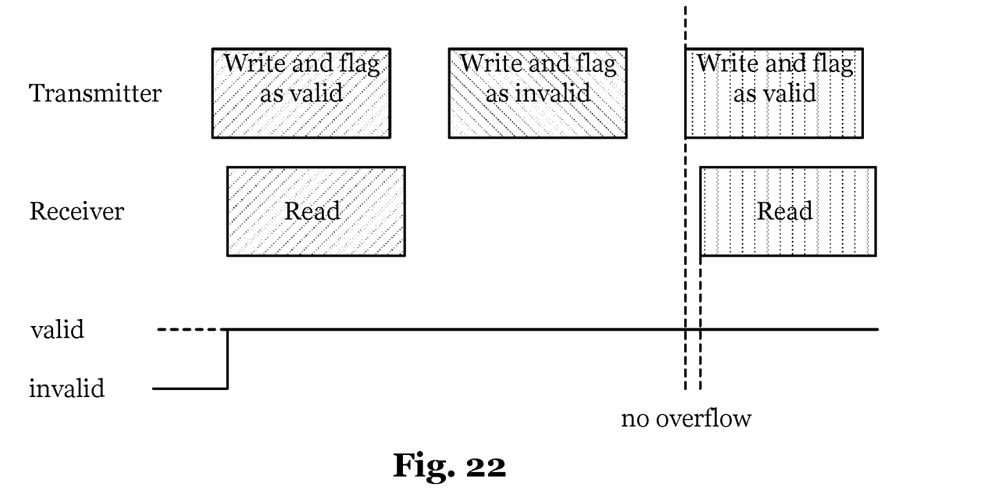

FIG. 22 illustrates an exemplary sequence of write and read accesses that differs from the sequence shown in FIG. 20 in that a data packet is written into the apparatus, but this packet is flagged as invalid so that the skipped read access does not cause overwriting of a validly written data packet.

Figure 23:
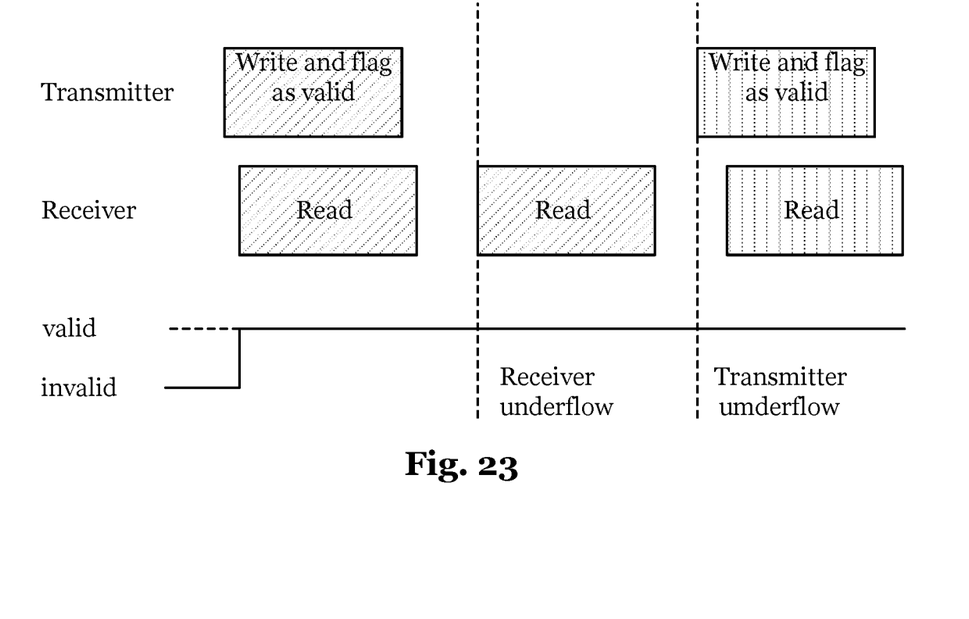
Figure 24:
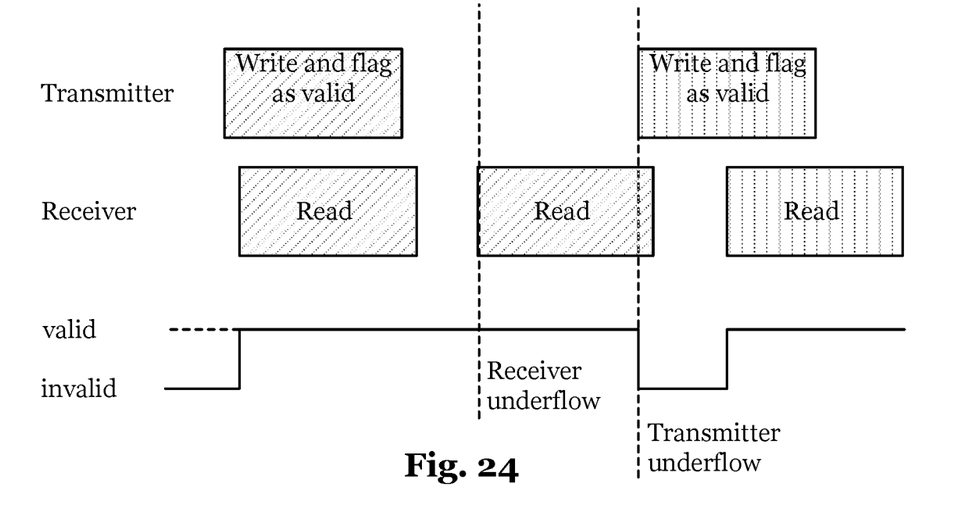

FIG. 23 illustrates an exemplary sequence of write and read accesses that triggers an underflow signal. Here, the same valid data packet is read out twice. As illustrated in FIG. 24, the underflow signal is also triggered when the second readout of the same valid data packet is aborted or the formerly valid data packet is flagged as stale, and hence invalid, during the readout.

Figure 25:
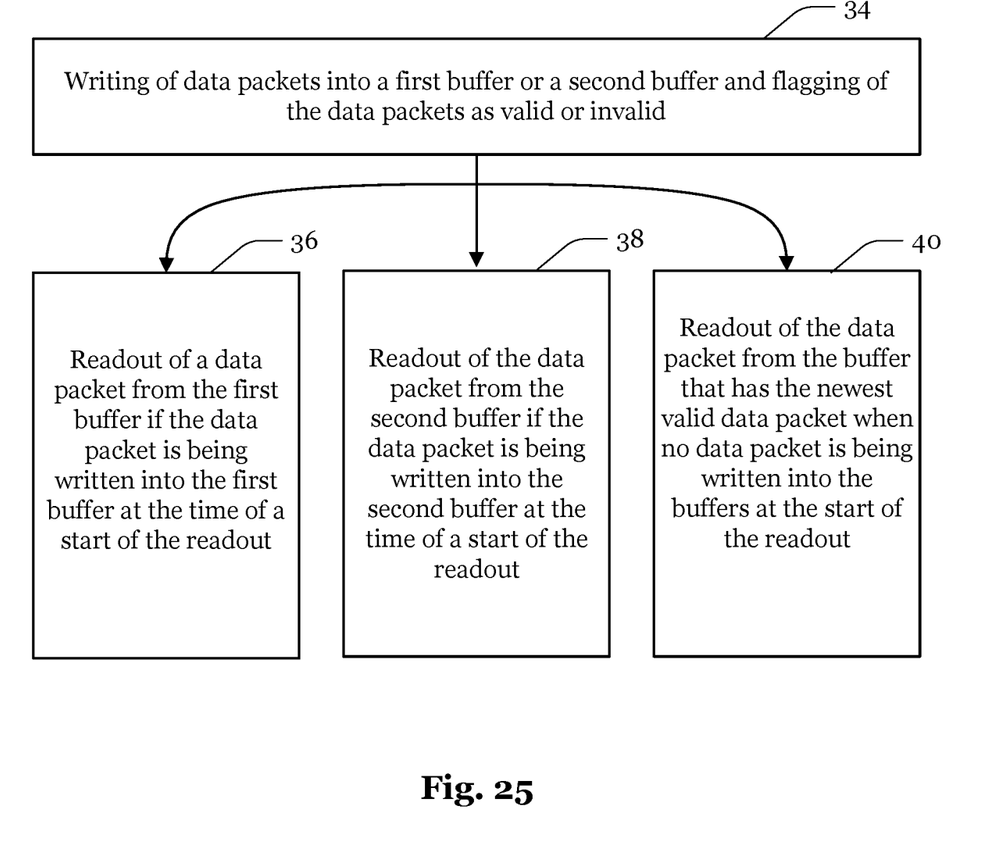
FIG. 25 shows a flowchart of a method for transmission of data packets from a transmitter to a receiver.

FIG. 25 illustrates a flowchart of a method for transmission of data packets from the transmitter 16 to the receiver 18. In step 34 here, as explained in detail above, data packets are written into the buffers 20, 22 and flagged as valid or invalid. At the time of the readout of a data packet, if the data packet is being written into one of the buffers 20, 22, then the data packet is read out of that buffer 20, 22 in step 36 or 38. However, if no data packet is being written into one of the buffers 20, 22 at the time of the readout, then the data packet is read out of the buffer 20, 22 that has the newest valid data packet. As a result, the transmitter 16 can write data into the apparatus 10 at any time and the receiver 18 can read data out of the apparatus 10 at any time.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus comprising:
a data input;
a data output;
a first buffer;
a second buffer; and
control logic equipped to route data packets that are received through the data input to the first buffer or the second buffer and to flag them as valid or invalid, and to provide data packets that are to be output through the data output from the first buffer or the second buffer,
wherein the control logic is equipped to provide a data packet, that is to be output through the data output, from the first buffer when the data packet is being written into the first buffer at a time of a start of a readout or to provide the data packet from the second buffer when the data packet is being written into the second buffer at the time of the start of the readout, such that the data packet that is being written into either the first buffer or the second buffer at the time of the start of the readout is output through the data output instead of a data packet previously written into the first buffer or the second buffer, and
wherein the control logic is equipped to provide the data packet from either the first buffer or the second buffer that has the newest valid data packet when no data packet is being written into either the first buffer or the second buffer at the time of the start of the readout.

2. The apparatus according to claim 1, wherein the control logic is equipped to flag a data packet as invalid if, while the data packet is being read out from one of the first or second buffers, writing of another data packet into one of the first or second buffers is begun.

3. The apparatus according to claim 1, wherein the control logic is equipped to flag a data packet as invalid if, while the data packet is being read out, a part of the data packet that is still to be read out is overwritten.

4. The apparatus according to claim 1, wherein the control logic is equipped to generate a read error signal when a data packet is read out that is flagged as invalid during or after the writing of the data packet.

5. The apparatus according to claim 1, wherein the control logic is equipped to provide a data packet, that is to be output through the data output, from either the first or second buffer that was last written if no new data packet is being written into the first and second buffers at the start of the readout and the data packet last written into the first or second buffer is flagged as valid.

6. The apparatus according to claim 1, wherein the control logic is equipped to continue providing a same newest valid data packet until a newer valid data packet is available.

7. The apparatus according to claim 1, wherein the control logic is equipped to generate an overflow signal when a valid data packet is overwritten without having been read out; and/or to generate an underflow signal when a valid data packet is read out more than once.

8. A system comprising:
a transmitter;
a receiver; and
an apparatus according to claim 1,
wherein the apparatus is equipped to provide, to the receiver, a continuous flow of data packets transmitted in a buffered manner from the transmitter.

9. The system according to claim 8, wherein the transmitter is equipped to read back a data packet from either the first or second buffer that has the newest valid data packet and to write the data packet into the apparatus again when the transmitter has no valid data packet that is more current, and wherein the transmitter is equipped to write a data packet into the apparatus at specific points in time.

10. A method for transmission of data packets from a transmitter to a receiver by an apparatus having a first buffer and a second buffer and control logic, the method comprising:
writing data packets into the first buffer or the second buffer;
flagging the data packets as valid or invalid;
reading out a data packet from the first buffer when the data packet is being written into the first buffer at a time of a start of a readout or reading out the data packet from the second buffer when the data packet is being written into the second buffer at the time of the start of the readout, such that the data packet that is being written into either the first buffer or the second buffer at the time of the start of the readout is read instead of a data packet previously written into the first buffer or the second buffer; and
reading out the data packet from either the first buffer or the second buffer that has the newest valid data packet when no data packet is being written into either the first buffer or the second buffer at the time of the start of the readout.

11. The method according to claim 10, further comprising:
generating a read error signal if, while a data packet is being read out from one of the first or second buffers, writing of another data packet into one of the first or second buffers has begun.

12. The method according to claim 10, further comprising: generating a read error signal if a data packet is read out that is flagged as invalid during or after the writing of the data packet.

13. The method according to claim 10, further comprising: generating an overflow signal if a valid data packet is overwritten without having been read out; and/or generating an underflow signal if a valid data packet is read out more than once.

14. The method according to claim 10, further comprising: reading back, by the transmitter, of a data packet and repeated writing of the read-back data packet into either the first or second buffer when the transmitter has no valid data packet that is more current, and wherein the transmitter is equipped to write a data packet into the apparatus at specific points in time.

* * * * *